United States Patent [19]
Lengyel et al.

[11] Patent Number: 5,468,064
[45] Date of Patent: Nov. 21, 1995

[54] NIGHT VISION COMPATIBLE COLOR CORRECTION SYSTEM

[75] Inventors: J. Michael Lengyel, Ramona, Calif.; Ronald C. Robinder, Albuquerque, N.M.

[73] Assignee: Honeywell Inc., Minneapolis, Minn.

[21] Appl. No.: 129,934

[22] Filed: Sep. 29, 1993

[51] Int. Cl.⁶ ................................................. G02F 1/1335
[52] U.S. Cl. ........................... 359/63; 359/82; 359/68
[58] Field of Search ............................ 359/63, 64, 66, 359/68, 82, 90, 491, 492, 485, 502

[56] References Cited

U.S. PATENT DOCUMENTS

| | | | |
|---|---|---|---|
| 4,166,871 | 9/1979 | Schuler | 359/491 |
| 4,541,693 | 9/1985 | Knoll et al. | 359/88 |
| 4,803,014 | 2/1989 | Okumura et al. | 359/491 |
| 4,968,119 | 11/1990 | Stewart | 350/333 |
| 5,013,138 | 5/1991 | Roosen et al. | 359/68 |
| 5,015,597 | 5/1991 | Vinouze et al. | 437/41 |
| 5,067,797 | 11/1991 | Yokokura et al. | 359/76 |

FOREIGN PATENT DOCUMENTS

| | | | |
|---|---|---|---|
| 63-81322 | 4/1988 | Japan | 359/64 |
| 1114821 | 5/1989 | Japan | 354/64 |
| 1137231 | 5/1989 | Japan | 359/64 |
| 1118113 | 8/1989 | Japan | 359/64 |

*Primary Examiner*—William L. Sikes
*Assistant Examiner*—Kenneth Parker
*Attorney, Agent, or Firm*—Robert W. Weig; Kenneth J. Johnson

[57] ABSTRACT

An apparatus for achieving an active matrix liquid crystal display flat panel that optically eliminates bluish or purplish background luminance and fluorescence of the liquid crystal materials. Two polarized layers are placed in a crossed configuration one behind and one in front of an active glass thin film transistor (TFT) layer to block a majority of any background luminance. Two layers of tinted glass are further placed one behind and one in front of the active glass TFT layer to block any remaining background luminance which has leaked through the polarizing layers.

17 Claims, 1 Drawing Sheet

NIGHT VISION COMPATIBLE COLOR CORRECTION SYSTEM

FIELD OF THE INVENTION

The present invention pertains generally to a device for displaying a picture, and more particularly to a liquid crystal display (LCD) flat panel that optically eliminates background luminance.

BACKGROUND OF THE INVENTION

In general, linear polarizers are constructed in a fashion such that a series of long thin conductors, placed parallel to each other, acts as a polarizer. This technique works well provided the length of the conductors is of the order of magnitude of the wavelength of the light to be polarized and their width and spacing is considerably less than that. When electromagnetic waves are incident on such a device, the component whose electric field oscillates parallel to the conductor length will set up currents in the conductor and be reflected or absorbed, whereas the transverse component will be affected only slightly and transmitted through the material thus providing polarized light.

The particular type of polarizer of present interest consists essentially of polyvinyl alcohol (PVA) sheets with the alignment of the polymer chains accomplished by stretching. Long needle shaped crystals of iodine are absorbed in the stretched sheet attaching themselves at the appropriate sites along each polymer chain and thus form the elongated regions of electric conductivity required for the absorption of light. By proper control of the iodine staining process, the polarizer can be made effective over a spectral region extending from 300 to 700 nanometers (nm).

The PVA film/iodine type of polarizer is selected for use in flat panel displays because it offers superior light blocking characteristics when operated in the crossed configuration and higher transmission when operated in the parallel configuration as compared to other birefringent crystal linear polarizers. However, in this type of polarizer, a "blue-leak" occurs at 428 nm. All but a very small amount of this one wavelength of light is passed by the PVA/iodine polarizers whether they are parallel ("clear") or crossed ("black"). The only 428 nm light that is absorbed is done so in the cellulose acetate laminates that are used to encapsulate the polarizing materials. In the crossed configuration (off-state), the 428 nm leak is highly undesirable and accounts for greater than 90% of the total amount of light that is not suppressed by the polarizers. Non-neutral off-state color experienced in a flat panel display that uses a PVA film/iodine based polarizer is due to the physical inability of the iodine to absorb light emitted at 428 nm regardless of its field orientation parallel or perpendicular.

At the long wavelength end of the visible spectrum, the polarizers in the crossed configuration (off-state) become increasingly transmissive to the longer wavelengths of visible light (still providing good attenuation for all but the longest of red wavelengths) until they become completely invisible to near infra red. In general, PVA/iodine polarizers used in the crossed configuration are very good attenuators of light that falls in the middle of the visible light spectrum. Left unchecked, the combination of the blue and red leakage elevates the background luminance of a flat panel display. The consequences are that contrast and dimming ratio are reduced.

In addition to the quantity of light that is leaked through the crossed polarizer configuration, the background color in the off-state is not the neutral grey or black color that is intended and the display emits a purple hue. This is of particular concern where requirements levied against the display unit demand the "black" background color be the same color as the emitted "white" light. Adjusting the emitted white color to a purple hued white has catastrophic effects on luminance. Under this condition, a very large loss in luminance occurs because the color purple, a mix of blue and red leaked by the polarizers in the crossed configuration, lacks the green wavelengths of light where the human visual system is most efficient.

Furthermore, liquid crystal materials (primarily the glass substrates) have been experimentally proven to fluoresce in the near infra red spectrum when exposed to very short wavelength visible and ultra violet (UV) light. Fluorescence of liquid crystal materials in the near infra red region have the potential of reducing the effectiveness of night vision goggles that are extremely sensitive to emissions in the near infra red spectrum.

It is also well-known that the human visual system becomes much more sensitive to blue and violet light when night adapted (the so-called Purkinje effect). This has the effect that the bluish or purplish background of an LCD is much is much more noticeable when operated at night, causing a further reduction of apparent contrast.

Therefore, there is a need for an active matrix liquid crystal display flat panel that optically eliminates background luminance. There is a further need to increase the contrast and dimming ratio and provide Night Vision Imaging System (NVIS) compatibility.

SUMMARY OF THE INVENTION

The present invention provides an apparatus for achieving an active matrix liquid crystal display flat panel that optically eliminates bluish or purplish background luminance and fluorescence of the liquid crystal materials. Two polarized layers are placed in a crossed configuration one behind and one in front of an active glass thin film transistor (TFT) layer to block a majority of any background luminance. Two layers of tinted glass are further placed one behind and one in front of the active glass TFT layer to block any remaining background luminance which has leaked through the polarizing layers. The contrast and dimming ratio of the panel are increased, and Night Vision Imaging System (NVIS) compatibility is improved.

DETAILED DESCRIPTION OF THE PREFERRED EMBODIMENTS

Figure 1:
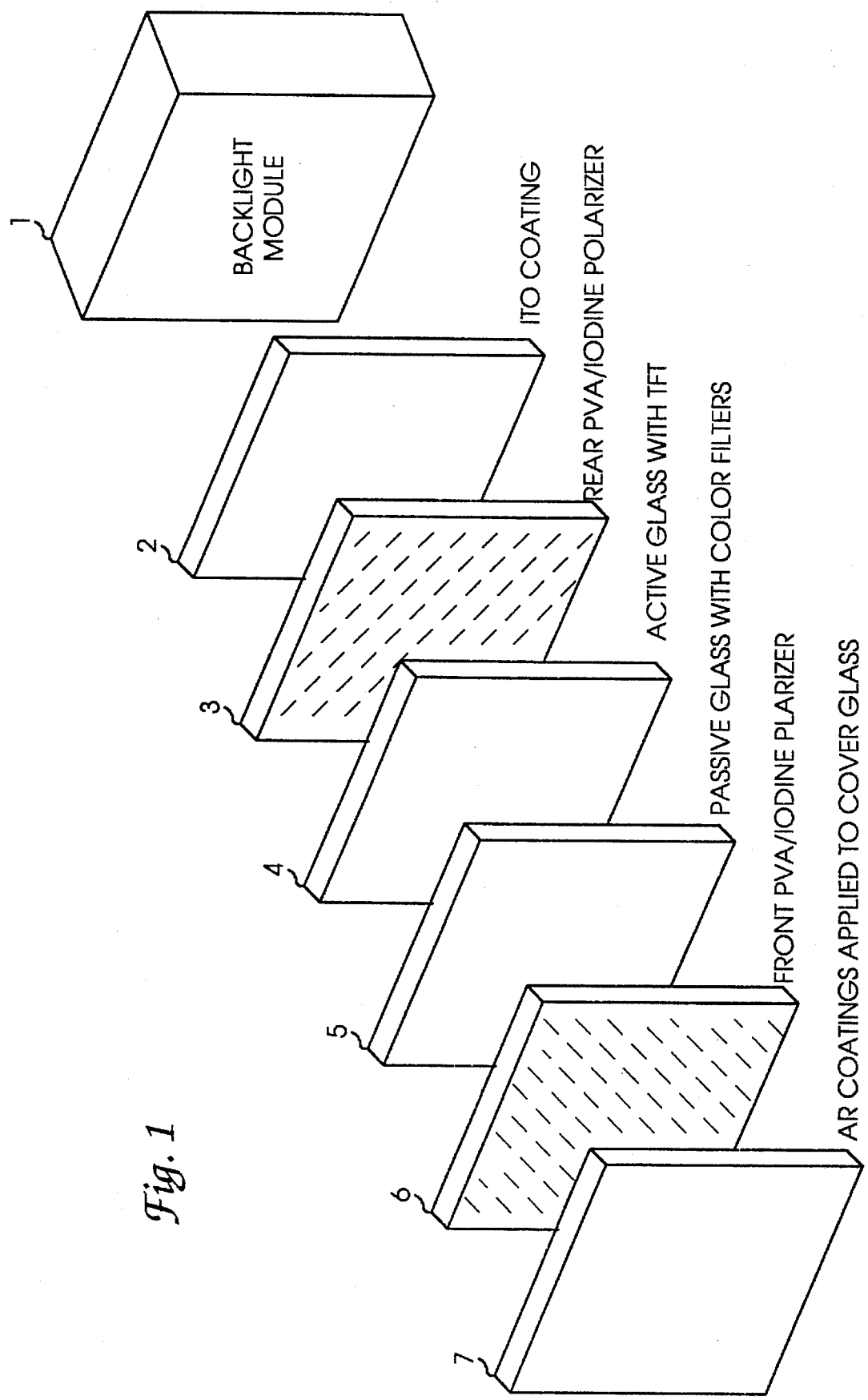
FIG. 1 is an exploded perspective view of the flat panel apparatus compatible with the present invention.

In the following detailed description of the preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

The problems of background luminance of off-state flat panel displays and lower contrast that are related to PVA film/iodine based polarizers are solved by using the UV/short-wavelength-visible absorbing medium of the preferred embodiment of the present invention, shown in FIG.

1. Similarly, near infra red fluorescence of liquid crystal materials caused by backlighting is solved with the same material.

Research has empirically shown that the total amount of in-line suppression of 428 nm light required to provide neutral off-state color is met by attenuating the amount of 428 nm light by 0.00001% or greater. This empirically derived level is required for visual off-state neutrality.

Laboratory tests by the assignee of the present invention, Honeywell Inc., were performed using American Polarizers Inc. PVA film/iodine based polarizers with a yellow colored glass as the suppression medium. The glass used was Schott Glass Technologies GG 455 glass 3 mm thick. However, one of ordinary skill in the art will recognize that other similar or equivalent polarizers and transmission media may be substituted for the above-named materials without loss of generality.

The tinted glass that has been selected as a "blue leak" light attenuator at 428 nm is also suitable as the host material for other coatings, such as anti-reflection. These coatings are typically an integral component of the an integrated flat panel display in real life applications.

There are two independent methods of visually creating a non-neutral off-state color on the front of the flat panel display. The first method is by shining incident ambient light (such as sunlight or fluorescent lamps) onto the face of the display. The second method is by emitting light from the backlight assembly.

FIG. 1 shows a preferred LCD panel construction. A back layer of tinted glass 2 is placed between the observer and a backlight lighting source 1. In front of the back layer of tinted glass 2 is a PVA/iodine polarizer layer 3 and an active glass with an array of thin film transistors (TFT) layer 4, for controlling the transmission of a liquid crystal. In front of the active glass layer is a layer of passive glass 5, a front layer of PVA/iodine polarizer 6 in crossed configuration with the back PVA/iodine layer 3, and finally a front layer of tinted glass 7 identical to the back layer of tinted glass 2.

In the preferred embodiment, each of the tinted glass layers 2 and 7 provide a maximum of 0.0032% transmission of 428 nm light. In such an embodiment, with either reflected ambient light or emitted light, there is adequate suppression of the 428 nm light to maintain neutral off-state color. In the case of ambient light, the light must pass through the front cover tinted glass layer 7, reflect off the inside of the display, and pass through the front cover tinted glass layer 7 a second time before it is viewed by the observer. The total amount 428 nm light after passing twice through the glass will therefore be attenuated by 0.00001% or greater (0.003%× 0.003%). In the case of emitted light, the light must pass through both front and rear tinted glass layers 2 and 7 before it is viewed by the observer. Again, total attenuation at 428 nm is 0.00001% or greater.

The advantage of eliminating background luminance is clearly evidenced in the requirements for military flat panel displays that state the background and the emitted active area be the same color. Backgrounds with a purple hue in the off-state would require a purple white emitted luminance. This significantly impairs the luminance output of the flat panel display since purple is a mix of red and blue light, but it is to green light that the human eye is most responsive. Consequently, compromising the amount of green primary to color balance emissive and reflected background light results in substantially reduced luminance.

In the event a UV source is selected for use as the backlight of an active matrix liquid crystal display, NVIS compatibility would be compromised unless the fluorescing elements are suppressed. Such suppression is also accomplished within the preferred embodiment of the present invention.

It will be noted that two alternative methods of 428 nm light suppression are also possible with the present invention. The first alternative method of light suppression is the suspension of a dye in the resin encapsulation materials used in the construction of the PVA film/iodine polarizers. With this first alternative method, the tinted glass layers 2 and 7 shown in FIG. 1 may be replaced by 428 nm light suppression dyes incorporated into the PVA film/iodine polarizers 3 and 6.

The second alternative method of light suppression is by the use of long pass, thin film vacuum deposition coatings on clear glass elements in the optical path. With this second method, the tinted glass layers 2 and 7 may be replaced by a thin film coating on a glass layer such as the active glass layer 4 and the passive glass layer 5. Each of these alternative methods of light suppression may provide for the elimination of the separate tinted glass layers 2 and 7, and may be substituted without loss of generality to the present invention.

The preferred embodiment of the present invention solves the problem of background luminance by controlling through absorption, backlight and incident ambient 428 nm light where the PVA film/iodine based polarizer is ineffective. Contrast is increased in such a device because the crossed polarizer transmission is lowered (the black is blacker), and the non-neutral color that is primarily a result of the "blue leak" is made more neutral when 428 nm light is absorbed. Near infra red fluorescence of the liquid crystal materials is eliminated via the same UV/short wavelength visible light absorption characteristics of the tinted glass layer avoiding potential conflicts with NVIS requirements.

The present invention is to be limited only in accordance with the scope of the appended claims, since others skilled in the art may devise other embodiments still within the limits of the claims.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

The embodiments of the invention in which an exclusive property or right is claimed are defined as follows:

1. An active matrix liquid crystal display (LCD) flat panel apparatus for optically eliminating background luminance and eliminating fluorescence of the liquid crystal materials, the panel comprising:

a first layer of tinted glass;

a first polarizer layer located between an observer and the first layer of tinted glass;

an active glass thin film transistor (TFT) layer located between the observer and the first polarizer layer;

a second polarizer layer in crossed configuration with that of the first polarizer layer, the second polarizer layer located between the observer and the active glass TFT layer, the second polarizer layer blocking the transmission of a majority of the wavelengths of light that have passed through the first polarizer layer; and a second layer of tinted glass located between the observer and the second polarizer layer, the second layer of tinted glass blocking the transmission of a majority of the wavelengths of light that have leaked through the first and second polarizer layers.

2. The flat panel apparatus of claim 1, wherein the first layer of tinted glass allows the transmission of less than or equal to substantially 0.0032% of the light at a wavelength of substantially 428 nm.

3. The flat panel apparatus of claim 1, wherein the second layer of tinted glass allows the transmission of less than or equal to substantially 0.0032% of the light at a wavelength of substantially 428 nm.

4. The flat panel apparatus of claim 1, wherein the first polarizer layer comprises a polyvinyl alcohol (PVA) iodine stained polarizer.

5. The flat panel apparatus of claim 1, wherein the second polarizer layer comprises a PVA/iodine stained polarizer.

6. The flat panel apparatus of claim 1 further comprising a passive glass layer located between the observer and the active glass TFT layer.

7. The flat panel apparatus of claim 6, wherein the passive glass layer further comprises RGB color filters.

8. An active matrix LCD flat panel apparatus for optically eliminating background luminance and eliminating fluorescence of the liquid crystal materials, the panel comprising:

a first layer of tinted glass;

a first PVA/iodine stained polarizer layer located between an observer and the first layer of tinted glass;

an active glass TFT layer located between the observer and the first PVA/iodine stained polarizer layer;

a passive glass layer located between the observer and the active glass TFT layer;

a second PVA/iodine stained polarizer layer in crossed configuration with that of the first PVA/iodine stained polarizer layer, the second PVA/iodine stained polarizer layer located between the observer and the active glass TFT layer, the second PVA/iodine stained polarizer layer blocking the transmission of a majority of the wavelengths of light that have passed through the first PVA/iodine stained polarizer layer; and a second layer of tinted glass located between the observer and the second PVA/iodine stained polarizer layer, the second layer of tinted glass blocking the transmission of a majority of the wavelengths of light that have leaked through the first and second PVA/iodine stained polarizer layers.

9. The flat panel apparatus of claim 8, wherein the first layer of tinted glass allows the transmission of less than or equal to substantially 0.0032% of the light at a wavelength of substantially 428 nm.

10. The flat panel apparatus of claim 8, wherein the second layer of tinted glass allows the transmission of less than or equal to substantially 0.0032% of the light at a wavelength of substantially 428 nm.

11. The flat panel apparatus of claim 8, wherein the passive glass layer further comprises RGB color filters.

12. An active matrix LCD flat panel apparatus for optically eliminating background luminance and eliminating fluorescence of the liquid crystal materials, the panel comprising:

a first polarizer layer for polarizing a majority of the wavelengths of light passing through the layer, and for blocking the transmission of a select range of wavelengths of light by the suspension of a dye within the layer, wherein said first polarizer layer allows the transmission of less than or equal to substantially 0.0032% of the light at a wavelength of substantially 428 nm;

an active glass TFT layer located between the observer and the first polarizer layer; and a second polarizer layer in crossed configuration with that of the first polarizer layer, the second polarizer layer located between the observer and the active glass TFT layer, the second polarizer layer blocking the transmission of the majority of polarized wavelengths of light that have passed through the first polarizer layer, and the second polarizer layer blocking the transmission of a select range of wavelengths of light by the suspension of a dye within the layer.

13. The flat panel apparatus of claim 12, wherein the second polarizer layer allows the transmission of less than or equal to substantially 0.0032% of the light at a wavelength of substantially 428 nm.

14. The flat panel apparatus of claim 12 further comprising a passive glass layer located between the observer and the active glass TFT layer.

15. The flat panel apparatus of claim 14, wherein the passive glass layer further comprises RGB color filters.

16. An active matrix LCD flat panel apparatus for optically eliminating background luminance and eliminating fluorescence of the liquid crystal materials, the panel comprising:

a first polarizer layer for polarizing a majority of the wavelengths of light passing through the layer;

an active glass TFT layer located between the observer and the first polarizer layer; and a second polarizer layer in crossed configuration with that of the first polarizer layer, the second polarizer layer located between the observer and the active glass TFT layer, the second polarizer layer blocking the transmission of the majority of polarized wavelengths of light that have passed through the first polarizer layer; and a passive glass layer located between the observer and the active glass TFT layer, the passive glass layer blocking the transmission of a select range of wavelengths of light via a coating applied to the surface of the layer and allowing the transmission of less than or equal to substantially 0.0032% of the light at a wavelength of substantially 428 nm.

17. The flat panel apparatus of claim 16, wherein the passive glass layer further comprises RGB color filters.

* * * * *